United States Patent Office 2,943,092
Patented June 28, 1960

2,943,092
METHOD OF PREPARING 4-AMINO-3-ISOXAZOLIDINONES

Jiří Smrt, 15 Karlovo nam, Prague II, Czechoslovakia; Jiří Beránek, 154 Cechova, Ruzyn, Czechoslovakia; and Jiří Sicher, 25 Kladska, Prague XII, Czechoslovakia No Drawing. Filed Apr. 23, 1957, Ser. No. 654,457

Claims priority, application Czechoslovakia May 2, 1956

6 Claims. (Cl. 260—307)

D-4-amino-3-isoxazolidinone is used as an antibiotic under the names oxamycine, seromycine or cycloserine. This substance was originally prepared by isolation from biological material.

The first synthesis, using serine methyl ester hydrochloride, was published in J. Am. Chem. Soc. 77, 2345 (1955). The method requires 6 preparation steps, some of which are quite difficult.

According to the present invention it is possible to produce D-4-amino-3-isoxalidinone or its L-form, or its D,L-form or derivatives thereof formed by the substitution of a hydrogen atom in the amino group, in a three step synthesis using esters of substituted ethylene imine carboxylic acids (A) as starting material. These esters are reacted in the first step with hydroxylamine, whereby the corresponding hydroxamic acids (B) are formed. In the second step the ethylene imine ring is split by means of an acid agent HX to $\beta$-X-$\alpha$ NHR-propionhydroxamic acid (C). In the third step the latter derivative is cyclized by means of a basic condensation agent to the corresponding 4-amino-3-isoxazolidinone.

The process according to the present invention may be illustrated by the following reaction scheme:

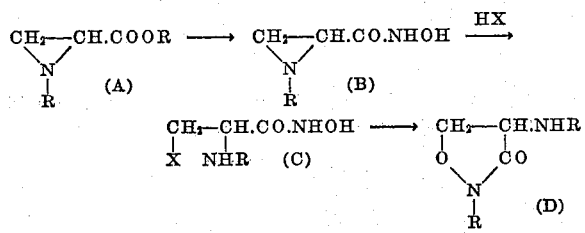

wherein X is a halogen or a —O.SO$_2$.R″ group, wherein R″ signifies an alkyl, aryl or aralkyl group; wherein R in formulas (A) and (B) is an alkyl or an aralkyl group, and in formulas (C) and (D) is a hydrogen atom, an alkyl or an aralkyl group; and wherein R′ is an alkyl radical.

The preparation of the hydroxamic acid in the first step is advantageously carried out by reacting hydroxylamine with an ester of a N-substituted ethylene imine carboxylic acid in an alcoholic solution or in an organic solvent medium, such as in dioxane, tetrahydrofurane or the like. The yield may be increased by adding basic agents, such as alkali metal oxides, hydroxides or alcoholates, or corresponding alkaline earth metal compounds. The yields may be further increased by using a greater than stoichiometric amount of hydroxylamine. The reaction in this step is advantageously carried out at temperatures under the boiling point of the used solvent.

As acid agent HX in the second step there may be used e.g. hydrogen chloride, hydrogen bromide, or an alkyl- or arylsulfonic acid. These agents should be added in an amount of two till three equivalents. In this step too an organic solvent like benzene, chloroform or ether may be used.

The second reaction step may be carried out either in an open vessel at temperatures under the boiling point of the solvent, or in a closed vessel at increased temperatures, i.e. under pressure. The isomeric compound simultaneously formed, the $\beta$-amino-$\alpha$-X-propionhydroxamic acid, may be removed by recrystallization from water or from methanol or from mixtures thereof, while ether or dioxane or a similar solvent may be added. During the ring opening the substituent R may be split off and replaced by hydrogen. This replacement takes place particularly if R is a triarylmethyl group.

Various compounds may be used as basic condensation agents in the third step, such as hydroxides, alcoholates, and oxides of alkali metals, oxides of alkaline earth metals, salts with alkaline reaction, ammonia, amines and organic nitrogen bases. Particularly good results may be obtained when using strongly basic anion exchange resins, such as basic condensation agents, for the cyclization.

The method according to the invention is illustrated by the following examples.

Example 1

61.7 g. of D,L-triphenylmethyl ethylene imine-2-carboxylic acid methyl ester were dissolved in 100 cc. of dioxane. This solution was added to a mixture previously prepared by dissolving 12.4 g. of metallic sodium in 150 cc. of methanol and adding a solution of 25.2 g. of hydroxylamine hydrochloride in 150 cc. of methanol. The mixture thus obtained was left standing three days at room temperature, whereafter 100 cc. of water and 22 cc. of glacial acetic acid were added. The solution was diluted with water to 2000 cc., whereby the raw hydroxamic acid was separated. After recrystallization from 600 cc. of benzene there were obtained 58 g. of D,L-1-triphenylmethyl ethylene imine-2-carbhydroxamic acid, M.P. 132–136° C.

34 g. of this intermediate were dissolved in 100 cc. of chloroform, 200 cc. of benzene having been added. Then gaseous hydrogen chloride was introduced until saturation. After two hours an insoluble substance was separated, which was purified by dissolving in 200 cc. of methanol and precipitating with 200 cc. of ether. The yield of D,L-$\beta$-chloro-$\alpha$-amino propionhydroxamic acid hydrochloride, M.P. 184–187° C., was 11.6 g.

7 g. of this substance were dissolved in 200 cc. of water and the solution was led through a column filled with a strongly basic anion exchange resin such as amberlite IRA-400 or staionit OAL. Then the column was washed with 200 cc. of water and 50 cc. of methanol. The desired substance was obtained by elution with 10 cc. of acetic acid in 500 cc. of methanol. The eluate was separated into 100 cc. fractions. By cooling down to —70° C. D,L-4-amino-3-isoxalidinone, M.P. 138–140° C. crystallized from a fraction in a yield of 2 g.

Example 2

90.6 g. of D,L-1-benzhydryl ethylene imine-2-carboxylic acid methyl ester were dissolved in 100 cc. of methanol and the solution thus obtained was added at once to a mixture of 47 g. of hydroxylamine hydrochloride in 500 cc. of methanol and 23.8 g. of metallic sodium in 400 cc. of methanol. The temperature was maintained at 40° C. After being left standing at room temperature for 55 hours the mixture was treated with 500 cc. of water and 70 cc. of glacial acetic acid. The yield of hydroxamic acid, M.P. 152–156° C., was 87.1 g.

53.6 g. of this intermediate were suspended in 400 cc. of benzene and then dry hydrogen chloride was led in during two hours while stirring and cooling to 0° C. Then hydrogen chloride was led in for two additional hours without cooling. After standing 2 hours at room temperature there were obtained 79 g. of a crystalline hydrochloride. By a recrystallization there were obtained 53 g. of D,L-β-chloro-α-benzhydrylamino propionhydroxamic acid hydrochloride, M.P. 172° C.

27.2 g. of this substance were dissolved in 800 cc. of methanol and the solution was added to a solution of 20 g. of sodium carbonate in 1600 cc. of water. After standing 96 hours at room temperature the solution was acidified with 15 cc. of glacial acetic acid in 200 cc. of ethanol. After an additional 12 hours at 4° C. there were obtained 18 g. of D,L-4-benzhydryl-amino-3-isoxazolidinone, M.P. 136° C.

*Example 3*

67.5 g. of the methyl ester of D,L-1-benzyl ethylene imine-2-carboxylic acid were dissolved in 50 cc. of methanol and the solution thus obtained was added to a mixture of 49.6 g. of hydroxylamine hydrochloride in 250 cc. of methanol and 24.6 g. of sodium in 300 cc. of methanol. The mixture was previously cooled down to 0° C. After standing for 48 hours at room temperature the solvent was distilled off in vacuo. The distillation residue was diluted with 150 cc. of water and acidified with 65 cc. of glacial acetic acid. The yield of D,L-1-benzyl ethylene imine-2-carbhydroxamic acid, M.P. 151–152° C., was 50 g.

20 g. of this hydroxamic acid were suspended in 300 cc. of benzene and then dry hydrogen chloride was led in at room temperature until to saturation. After 24 hours there were obtained 28 g. of a product, from which 20.5 g. of D,L-β-chloro-α-benzylamino propionhydroxamic acid hydrochloride, M.P. 134° C–136° C. were obtained.

8 g. of this hydrochloride were dissolved in 300 cc. of methanol and the solution poured into a solution of 2.4 g. of sodium hydroxide in 500 cc. of water. After standing 62 hours at 4° C. the solution was acidified with acetic acid to pH 6. There were obtained 4.5 g. of D,L-4-benzyl-amino-3-isoxazolidinone, M.P. 147° C.

*Example 4*

7.3 g. of D,L-triphenylmethyl ethylene imine-2-carboxylic acid methyl ester were dissolved in 10 cc. of dioxane and the solution thus obtained was added to a mixture of 3 g. of hydroxylamine hydrochloride in 25 cc. of methanol and 1.5 g. of sodium in 25 cc. of methanol at room temperature. After 3 days standing at room temperature the mixture was acidified with 2.6 cc. of acetic acid and diluted slowly while stirring with 200 cc. of water. The separated substance was washed with 200 cc. of water and dried at 40° C. There were obtained 7.3 g. of D-1-triphenylmethyl ethylene imine-2-carbhydroxamic acid, M.P. 122–123° C.

7.3 g. of this intermediate were stirred in 50 cc. of benzene and the mixture was saturated at room temperature with gaseous hydrogen chloride. After one hour standing the separated substance was sucked off and recrystallized from a mixture of 60 cc. of methanol and 120 cc. of ether. There were obtained 2.95 g. of D-α-amino-β-chloropropionhydroxamic acid hydrochloride, M.P. 197–198° C.

2 g. of this intermediate were dissolved in 20 g. of water and the solution was led through a 40 cc. column filled with anion exchange resin Amberlite IRA–400 in an OH-cycle. After washing with 100 cc. of water the column was slowly eluated with 20 percent acetic acid. The eluate, giving red color with ferric chloride, was diluted with 80 cc. of ethanol. By cooling the ethanolic solution to −70° C. there were obtained 0.6 g. of D-4-amino-3-isoxazolidinone, M.P. 150–152° C. The substance is identical with the neutral antibiotic. Its value of $\alpha_D^{20}$ is 114.5.

We claim:

1. In a method of preparing a blocked beta-acido propionhydroxamic acid and its cyclization in the presence of a basic agent to form the corresponding 4-amino-3-isoxazolidinone having the following general formula:

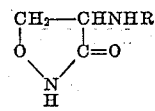

wherein R is a triarylmethyl radical, the steps of reacting an ethylene imine carboxylic acid alkyl ester having the following general formula:

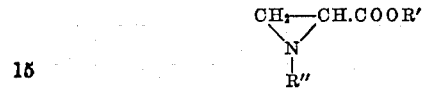

wherein R″ is an aralkyl radical and wherein R′ is a lower alkyl group with hydroxylamine so as to form the corresponding hydroxamic acid having the following general formula:

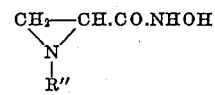

wherein R″ has the same definition as above; and reacting said hydroxamic acid with an acid agent selected from the group consisting of hydrogen halides, alkyl sulfonic acid and aryl sulfonic acid so as to form the corresponding beta-acido-propionhydroxamic acid having the following general formula:

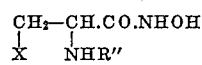

wherein R″ has the same definition as above and wherein X is the acidic anion of said acid agent.

2. In a method of preparing a blocked beta-acido propionhydroxamic acid and its cyclization in the presence of a basic agent to form the corresponding 4-amino-3-isoxazolidinone having the following general formula:

the steps of reacting an ethylene imine carboxylic acid alkyl ester having the following general formula:

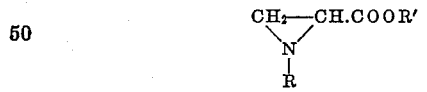

wherein R is a triarylmethyl radical and wherein R′ is a lower alkyl group with hydroxylamine so as to form the corresponding hydroxamic acid having the following general formula:

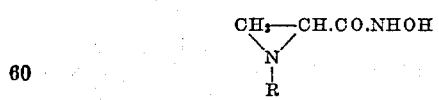

wherein R has the same definition as above; and reacting said hydroxamic acid with an acid agent selected from the group consisting of hydrogen halides, alkyl sulfonic acid and aryl sulfonic acid and splitting off said triarylmethyl group so as to form the corresponding beta-acido-propionhydroxamic acid having the following general formula:

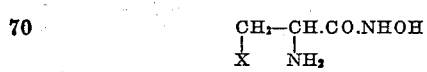

wherein X is the acidic anion of said acid agent.

3. In a method of preparing a blocked beta-acido propionhydroxamic acid and its cyclization in the presence of a basic agent to form the corresponding 4-amino-3-isoxazolidinone having the following general formula:

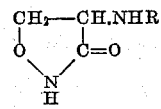

wherein R is selected from the group consisting of hydrogen and aralkyl radicals, the steps of reacting an ethylene imine carboxylic acid alkyl ester having the following general formula:

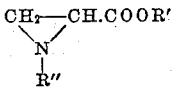

wherein R'' is an aralkyl radical and wherein R' is a lower alkyl group with hydroxylamine so as to form the corresponding hydroxamic acid having the following general formula:

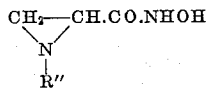

wherein R'' has the same definition as above; and reacting said hydroxamic acid with an acid agent selected from the group consisting of hydrogen halides, alkyl sulfonic acid and aryl sulfonic acid so as to form the corresponding beta-acido-propionhydroxamic acid having the following general formula:

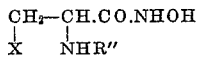

wherein R'' has the same definition as above and wherein X is the acidic anion of said acid agent.

4. In a method of preparing a blocked beta-acido propionhydroxamic acid and its cyclization in the presence of a basic agent to form the corresponding 4-amino-3-isoxazolidinone having the following general formula:

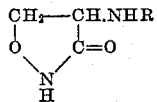

wherein R is selected from the group consisting of hydrogen and aralkyl radicals, the steps of reacting an ethylene imine carboxylic acid alkyl ester having the following general formula:

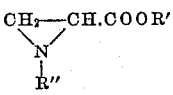

wherein R'' is an aralkyl radical and wherein R' is a lower alkyl group with hydroxylamine in an organic liquid medium in the presence of a basic agent selected from the group consisting of alkali metal and alkaline earth metal oxides, hydroxides and alcoholates so as to form the corresponding hydroxamic acid having the following general formula:

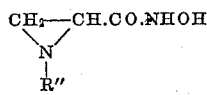

wherein R'' has the same definition as above; and reacting said hydroxamic acid with an acid agent selected from the group consisting of hydrogen halides, alkyl sulfonic acid and aryl sulfonic acid so as to form the corresponding beta-acido-propionhydroxamic acid having the following general formula:

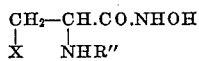

wherein R'' has the same definition as above and wherein X is the acidic anion of said acid agent.

5. In a method of preparing a blocked beta-acido propionhydroxamic acid and its cyclization in the presence of a basic agent to form the corresponding 4-amino-3-isoxazolidinone having the following general formula:

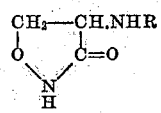

wherein R is selected from the group consisting of hydrogen and aralkyl radicals, the steps of reacting an ethylene imine carboxylic acid alkyl ester having the following general formula:

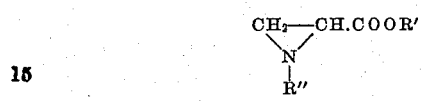

wherein R'' is an aralkyl radical and wherein R' is a lower alkyl group with hydroxylamine in an organic liquid medium in the presence of a basic agent selected from the group consisting of alkali metal and alkaline earth metal oxides, hydroxides and alcoholates utilizing a greater than stoichiometric amount of hydroxylamine so as to form the corresponding hydroxamic acid having the following general formula:

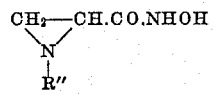

wherein R'' has the same definition as above; and reacting said hydroxamic acid with an acid agent selected from the group consisting of hydrogen halides, alkyl sulfonic acid and aryl sulfonic acid so as to form the corresponding beta-acido-propionhydroxamic acid having the following general formula:

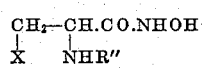

wherein R'' has the same definition as above and wherein X is the acidic anion of said acid agent.

6. In a method of preparing a blocked beta-acido propionhydroxamic acid and its cyclization in the presence of a basic agent to form the corresponding 4-amino-3-isoxazolidinone having the following general formula:

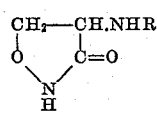

wherein R is selected from the group consisting of hydrogen and aralkyl radicals, the steps of reacting an ethylene imine carboxylic acid alkyl ester having the following general formula:

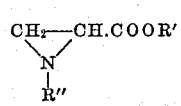

wherein R'' is an aralkyl radical and wherein R' is a lower alkyl group with hydroxylamine so as to form the corresponding hydroxamic acid having the following general formula:

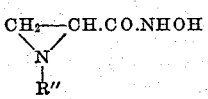

wherein R'' has the same definition as above; and reacting said hydroxamic acid with an acid agent selected from the group consisting of hydrogen halides, alkyl sulfonic acid and aryl sulfonic acid utilizing two to three equivalents of said acid agent per each equivalent of said hydroxamic acid so as to form the corresponding betaacido-propionhydroxamic acid having the following general formula:

$$\underset{X}{\text{CH}_2}-\underset{NHR''}{\text{CH.CO.NHOH}}$$

wherein R'' has the same definition as above and wherein X is the acidic anion of said acid agent.

References Cited in the file of this patent

UNITED STATES PATENTS 2,772,280    Peck _____ Nov. 27, 1956

OTHER REFERENCES

Organic Chem., Karrer, Elsevier Pub. Co. Inc., New York, N.Y., 1950, p. 195.

Freundlich et al.: Chem. Abstracts, vol. 24 (1930), p. $3487^2$.

Helferich et al.: Ber. Deut. Chem., vol. 58, pp. 883–5 (1925).

Stammer et al.: J. Am. Chem. Soc., vol. 77, pp. 2346–7 (1955).